(12) United States Patent
Gevers

(10) Patent No.: US 7,993,107 B2
(45) Date of Patent: Aug. 9, 2011

(54) ONSHORE WIND TURBINE WITH TOWER SUPPORT SYSTEM

(75) Inventor: William Francis Gevers, Easley, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/911,090

(22) Filed: Oct. 25, 2010

(65) Prior Publication Data
US 2011/0142682 A1   Jun. 16, 2011

(51) Int. Cl.
*F03D 11/04* (2006.01)
*E04H 12/20* (2006.01)

(52) U.S. Cl. ............... 416/244 R; 416/DIG. 6; 52/152; 248/163.1; 405/227

(58) Field of Classification Search .......... 52/40, 146, 52/149, 150, 152, 170, 835, 651.07, 651.09, 52/169.13, 296, 297; 248/529, 163.1, 165; 405/224, 224.2, 227; 416/DIG. 6, 244 R; 290/44, 55; 343/874; 174/45 R
See application file for complete search history.

(56) References Cited

U.S. PATENT DOCUMENTS

| | | | | |
|---|---|---|---|---|
| 866,303 A * | 9/1907 | Reynolds | ................. | 52/152 |
| 877,268 A * | 1/1908 | Van Buren | ................. | 52/165 |
| 1,722,352 A * | 7/1929 | Rawley | ................. | 52/152 |
| 2,448,304 A * | 8/1948 | Gabel | ................. | 47/40.5 |
| 2,784,556 A * | 3/1957 | Perdue | ................. | 60/398 |
| 2,849,202 A * | 8/1958 | McCombs | ................. | 248/515 |
| 2,901,890 A * | 9/1959 | Hutchison | ................. | 405/224 |
| 2,903,856 A * | 9/1959 | En Dean | ................. | 405/225 |
| 3,239,176 A * | 3/1966 | Johnson | ................. | 248/166 |
| 3,371,458 A * | 3/1968 | Sturgill | ................. | 52/651.01 |
| 4,000,624 A * | 1/1977 | Chow | ................. | 405/204 |
| 4,403,916 A * | 9/1983 | Skelskey | ................. | 416/14 |
| 4,438,896 A * | 3/1984 | Hall | ................. | 248/523 |
| 4,553,878 A * | 11/1985 | Willemse et al. | ................. | 405/203 |
| 4,557,629 A * | 12/1985 | Meek et al. | ................. | 405/204 |
| 4,607,983 A * | 8/1986 | Meek et al. | ................. | 405/204 |
| 4,669,917 A * | 6/1987 | Sveen | ................. | 405/227 |
| 4,687,380 A * | 8/1987 | Meek et al. | ................. | 405/204 |
| 5,002,252 A * | 3/1991 | Setala et al. | ................. | 248/533 |
| 5,051,037 A * | 9/1991 | Haney et al. | ................. | 405/227 |
| 5,174,724 A * | 12/1992 | Ammons | ................. | 417/35 |
| 5,233,809 A * | 8/1993 | Gropper | ................. | 52/150 |
| 5,465,529 A * | 11/1995 | Park | ................. | 47/40.5 |
| RE35,912 E * | 9/1998 | Gomez de Rosas et al. | . | 405/227 |
| 7,156,586 B2 * | 1/2007 | Nim | ................. | 405/223.1 |
| 7,198,453 B2 * | 4/2007 | Hall | ................. | 415/4.3 |
| 7,367,780 B2 | 5/2008 | Kothnur et al. | | |
| 7,508,088 B2 * | 3/2009 | Kothnur et al. | ................. | 290/44 |
| 7,530,780 B2 | 5/2009 | Kothnur et al. | | |
| 7,735,290 B2 * | 6/2010 | Arsene | ................. | 52/651.01 |

(Continued)

*Primary Examiner* — Robert J Canfield
(74) *Attorney, Agent, or Firm* — Dority & Manning, P.A.

(57) ABSTRACT

A wind turbine includes a nacelle with any manner of associated power generation equipment. The nacelle is mounted atop a tower having a base end configured for support on a ground level foundation. A tower support system provides support to the tower and includes an axially extending circumferential sleeve mounted around the tower at a location between the base end and the nacelle. A plurality of support legs are disposed around the sleeve, with each support leg having a first end rigidly affixed to the sleeve and an opposite foot end configured for mounting to a ground level footing. The support legs extend from the sleeve with a length and at an acute extension angle relative to a longitudinal axis of the tower so as to provide a designed degree of vertical and lateral support around the circumference of the tower.

14 Claims, 4 Drawing Sheets

U.S. PATENT DOCUMENTS

2009/0307998 A1* 12/2009 Zavitz et al. .................... 52/152
2010/0005731 A1* 1/2010 Marvin et al. .................... 52/40
2010/0150663 A1* 6/2010 Martinez ....................... 405/222
2010/0301613 A1* 12/2010 Oosterling ..................... 290/55

* cited by examiner

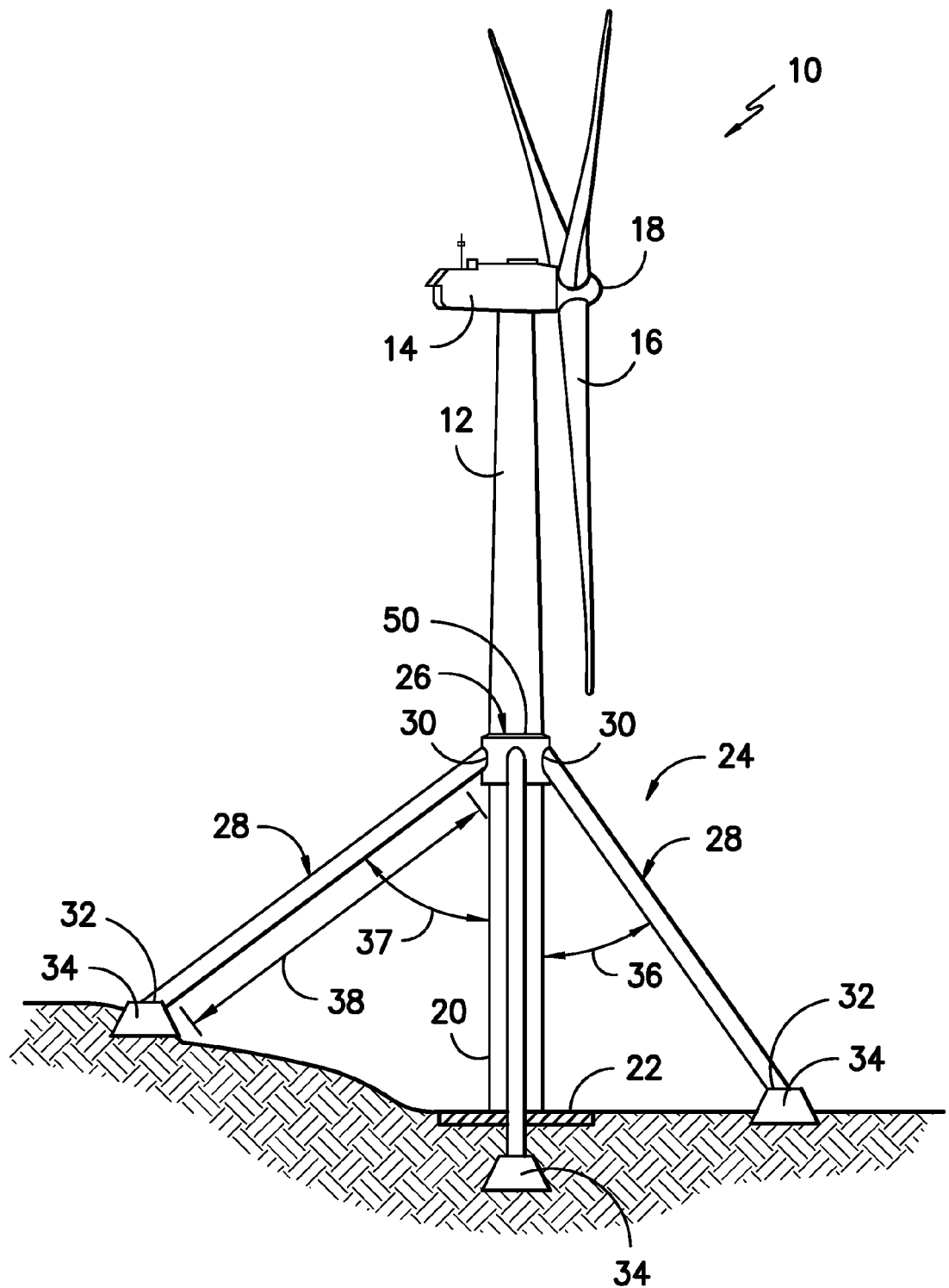
FIG. -1-

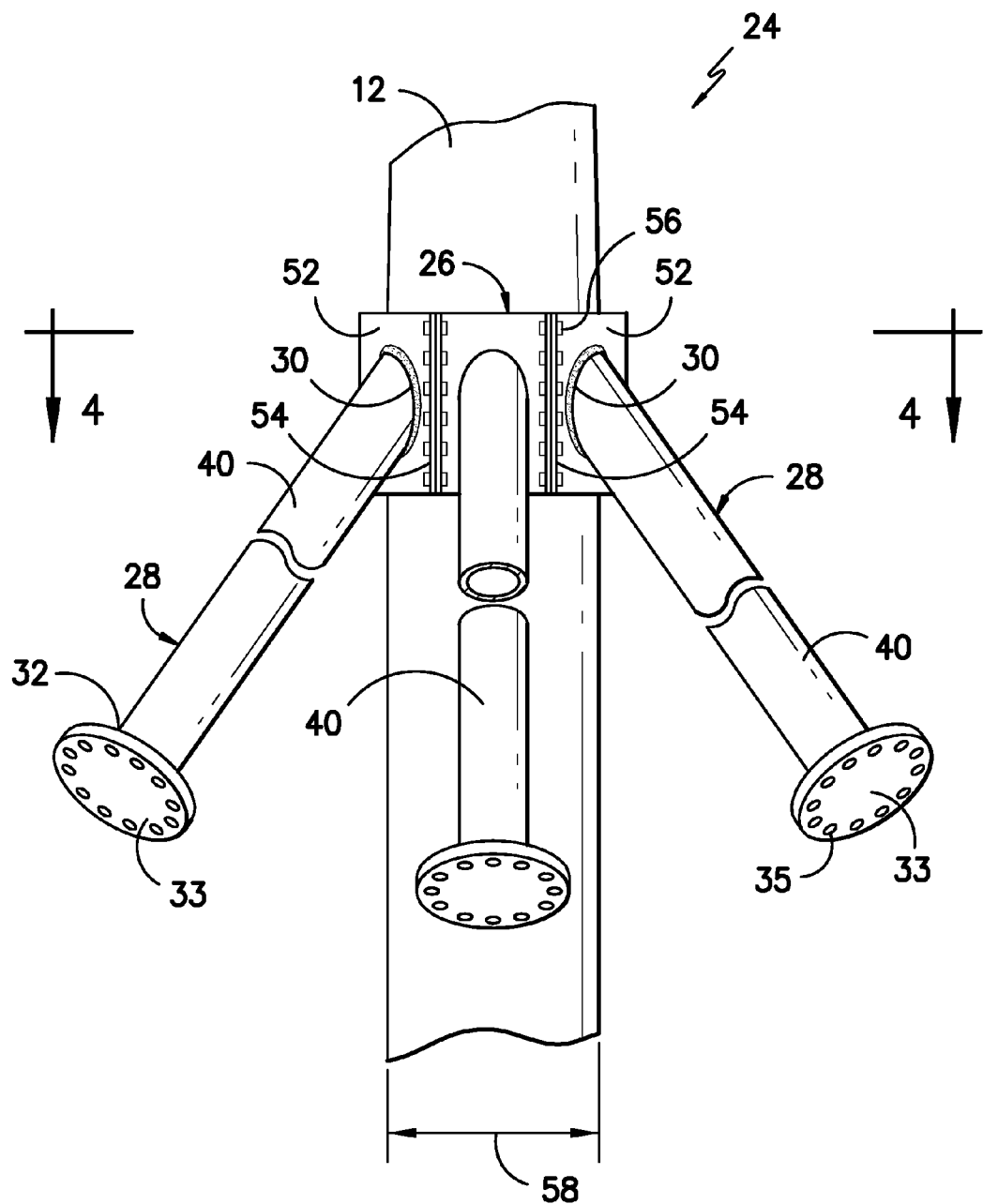
FIG. -2-

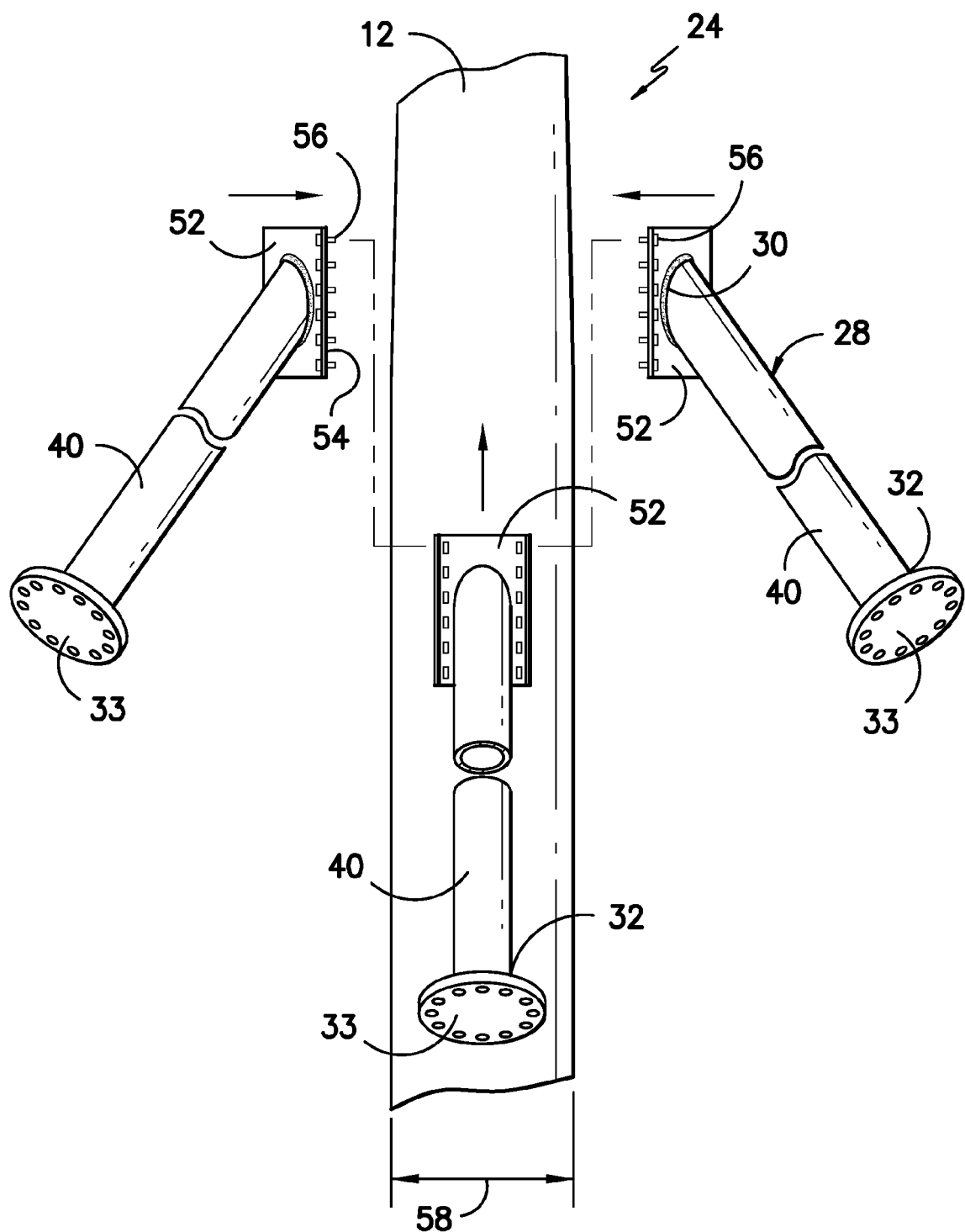
FIG. -3-

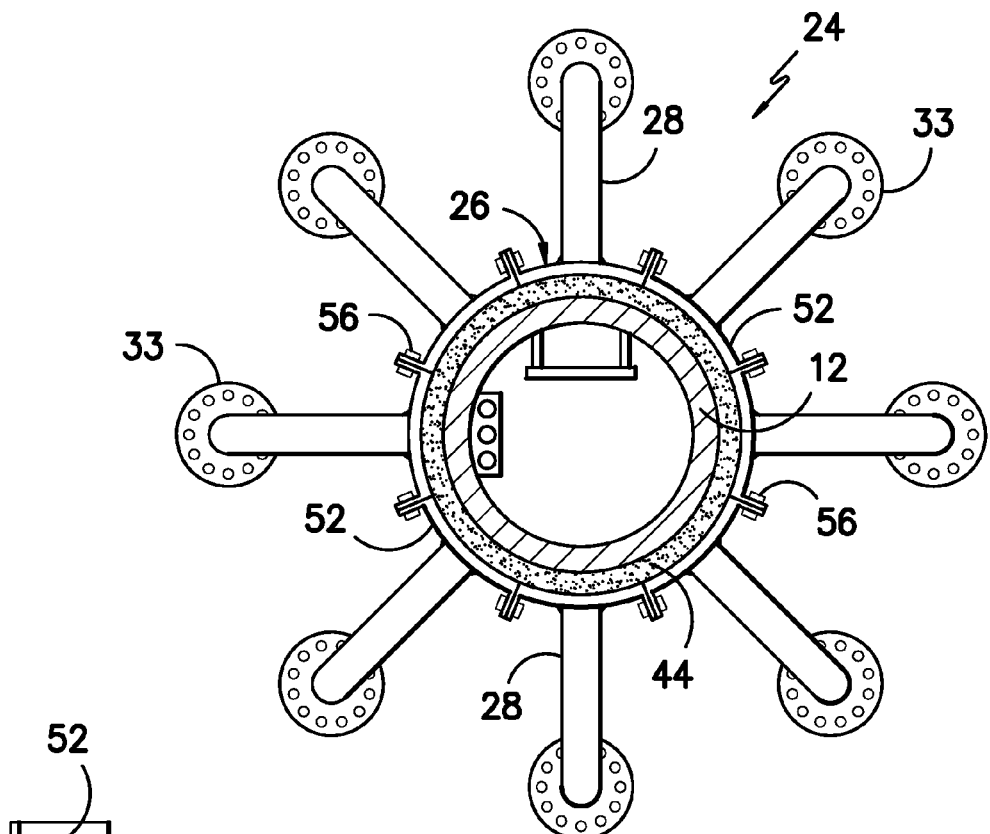
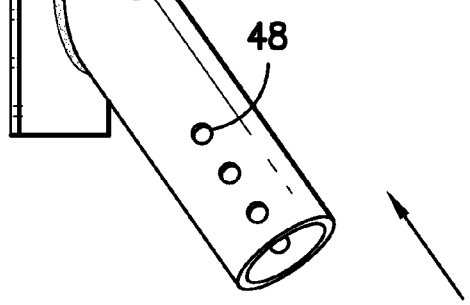
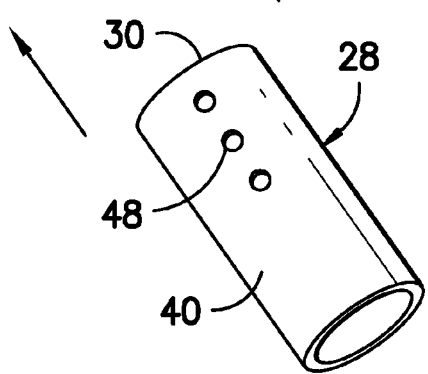
FIG. -4-
FIG. -5-

ONSHORE WIND TURBINE WITH TOWER SUPPORT SYSTEM

FIELD OF THE INVENTION

The present invention relates generally to the field of wind turbines, and more particularly to a base support system for onshore wind turbine towers.

BACKGROUND OF THE INVENTION

Modern land-based ("onshore") wind turbines in the megawatt range have grown increasingly more powerful and correspondingly larger. The towers that support the power generating components of these wind turbines can exceed well over 60 meters in height. For example, GE Wind Energy offers a 2.5 MW wind turbine with standard available hub heights of 75 meters, 85 meters, and 100 meters. Larger wind turbines with hub heights in excess of 100 meters are becoming more common.

The tower structures of these large wind turbines can be massive, particularly at the base section of the tower wherein a significant footprint and weight are needed to achieve design tower support criteria. In this regard, the towers are becoming increasing more expensive to manufacture, transport, and erect. In many instances, the dimensions of the lower tower sections are limiting factors in site selection and transport of the tower sections to the site. For example, the tower sections cannot exceed the local jurisdiction's maximum size and weight limits for rail and truck transport.

Accordingly, the industry would benefit from an improved tower structure that is capable of supporting larger turbines at significant hub heights without the size, weight, and cost issues of conventional towers.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine is provided with a nacelle mounted atop a tower. The nacelle is configured with any manner of wind turbine power generating components. The tower has a base end that is configured for support on any manner of suitable ground level foundation. A support system is provided for the tower that allows for reduction in the weight and diameter of the lower sections of the tower. The support system includes an axially extending circumferential sleeve mounted around the tower at a predefined location between the base end and the nacelle, for example between about 25% to about 75% of the tower height measured from the base. A plurality of support legs have a first end rigidly affixed to the sleeve and an opposite foot end configured for mounting to any manner of suitable ground level footing. The support legs have a length and extension angle relative to a vertical axis of the tower so as to provide vertical and lateral support around the circumference of the tower.

In a unique embodiment, the sleeve is mounted to the tower with a layer of adhesive compound material applied between the sleeve and tower. This compound may be, for example a grout, cement, epoxy, and so forth.

The support legs may be tubular members that are equally circumferentially spaced around the sleeve, with the first end of the support legs permanently affixed to sleeve. In an alternative embodiment, the first end of the support legs is mechanically fastened to and releasable from the sleeve. For example, the first ends may be slidable onto and attached to a respective male post affixed to the sleeve.

In one embodiment, the sleeve may be an integrally formed singular ring member that slides onto a section of the tower during erection of the wind turbine. In an alternate embodiment, the sleeve may be defined by a plurality of segments that are joined together around the tower, with each segment having at least one support leg permanently or releasably affixed thereto.

The support system provides for a reduction in the weight and footprint of the base sections of the tower. In this regard, the tower may be a tubular member that has a substantially constant diameter from the sleeve location to the base end, and may also have a substantially constant mass per unit of length from the sleeve to the base end.

In a particular embodiment, the support legs may vary in size and extension angle around the circumference of the tower to accommodate for uneven ground terrain around the tower, or any other factor.

The present invention also encompasses a support system for wind turbine towers having an axially extending circumferential sleeve with a designed size so as to fit around a wind turbine tower at a defined height. A plurality of support legs have a first end rigidly affixed to the sleeve and an opposite foot end configured for mounting to a ground level footing. The support legs have an extension length and angle relative to vertical so as to provide vertical and lateral support when the support system is configured on a wind turbine tower.

The tower support system may have any combination of the features discussed above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a wind turbine with a tower support system in accordance with aspects of the invention;

FIG. 2 is a perspective view of an embodiment of portions of a tower support system;

FIG. 3 is a perspective component view of the embodiment of FIG. 2;

FIG. 4 is a top cross-sectional view of the tower support system taken along the lines indicated in FIG. 2; and, FIG. 5 is a perspective view of an embodiment for attaching a support leg to a sleeve section.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft within the nacelle 14. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 1 also illustrates an embodiment of a tower support system 24 in accordance with aspects of the invention. The support system 24 includes an axially extending circumferential sleeve 26 that is mounted around the tower 12 at a predefined location between a base end section 20 of the tower and the nacelle 14. The location of the sleeve 26 will vary as a function of any number of variables, including the overall height of the tower 12, the weight supported by the tower 12, location of the tower 12 at a particular onshore site, and so forth. In a particular embodiment, the sleeve 26 is located at a height of between about 25% to about 75% of the height of the tower 12 as measured from the bottom of the base end 20. For example, the sleeve 26 may be mounted on the tower 12 at a location that is about 50% of the tower height.

A plurality of support legs 28 are configured relative to the sleeve 26, with each leg 28 having a first end 30 that is rigidly affixed to the sleeve 26 and an opposite foot end 32 that is configured for mounting to any manner of suitable ground level footing 34, as depicted in FIG. 1. Referring to FIG. 2, the foot end 32 of each of the support legs 28 may include any manner of flange 33 or other suitable structure for securely mounting the foot end 32 in or on a footing 34. For example, the flange 33 may include a plurality of bolt holes 35 for securing the flange 33 to bolts that are pre-disposed in each footing 34. It should also be appreciated that the flanges 33 may be defined at the foot end 32 at any pre-defined angle depending on the orientation of the footing 34 and respective mounting configuration.

The support legs 28 extend from the sleeve 26 with a length 38 and an acute extension angle 36, 37 relative to a longitudinal axis of the tower so as to provide vertical and lateral support around the circumference of the tower 12. It should be appreciated that the number of legs 28, angles 36, 37, and length 38 of the respective legs 28 will vary as a function of any number of factors, such as height of the tower 12, weight of the components supported by the tower 12, terrain at the wind turbine site, and so forth. It is well within the capabilities of those skilled in the art to configure the support system 12 as needed through computer modeling, empirical data, and so forth.

In the embodiment of FIG. 1, the sleeve 26 is depicted as a unitary ring member 50. With this particular embodiment of the sleeve member 26, the ring 50 would be fitted onto one of the tower sections 12 during erection of the tower 12 at the turbine site. The ring member 50 would have an inner diameter so as to easily slide onto the tower section in this regard.

In an alternative embodiment illustrated for example in FIGS. 2 and 3, the sleeve member 26 comprises a plurality of individual sleeve segments 52 that are joined together around the tower 12. As particularly seen in FIGS. 2 and 3, each of the segments 52 may include axially extending flanges 54 that bolt to flanges of adjacent segments 52 around the circumference of the tower 12 with bolts 56. Each of the segments 52 may include one of the support legs 28 having a first end 30 affixed to the sleeve segment 52 at the predefined extension angle 36, 37. With this particular embodiment, the sleeve member 26 can be formed around the tower 12 after erection of the tower at the turbine site.

Referring to FIG. 4 in particular, in a unique embodiment of the support system 24, an adhesive compound 44 is used to mount the sleeve member 26 around the tower 12. This compound 44 may be, for example, an adhesive grout, epoxy, cement, or the like. This adhesive compound 44 provides numerous advantages to the system 24. The compound 44 provides an essentially permanent and maintenance-free mounting system between the sleeve 26 and tower 12. In addition, the compound 44 has a degree of compressibility and resiliency that will accommodate a degree of relative movement between the tower 12 and sleeve member 26 with attached support legs 28. Such relative movement may occur, for example, during high wind or other adverse weather conditions, seismic events, and the like. The resilient adhesive compound 44 will thus absorb much of the induced stresses that would otherwise be generated between the sleeve 26 and tower 12.

The support legs 28 may comprise any manner of structure, including girder or beam-like members, solid members, and so forth. In the illustrated embodiment, the support legs 28 are defined by tubular members 40 having a first end 30 that is affixed at the predefined angle 36, 37 to the sleeve 26. The tubular members 40 may be equally spaced around the circumference of the tower 12, as depicted in the embodiment of FIG. 4. In an alternate embodiment, the tubular members 40 may be spaced around the tower 12 at any desired circumferential position and configuration, which can vary depending on the terrain of the turbine site and any other number of factors. It should thus be appreciated that the support system 22 is not limited to any particular number of support legs 28 or configuration of the legs 28 around the tower 12.

The first ends 30 of the support legs 28 may be permanently affixed to the sleeve member 26, for example by welding or any other suitable permanent attaching process, particularly in the embodiment illustrated in FIGS. 2 and 3 wherein the support legs 28 are affixed to the plurality of respective sleeve segments 52. Referring to FIG. 3, it can thus be appreciated that each of the individual support legs 28 with attached sleeve segments 52 and flange 33 may be individually transported to the wind turbine site. In alternate embodiments, the sleeve segments 52 and flanges 33 may be welded or otherwise affixed to the tubular members 40 at the wind turbine site.

In an alternate embodiment depicted for example in FIG. 5, the tubular members 40 that define the support legs 28 may be mechanically fastened to the sleeve 26, and in particular to the individual sleeve segments 52. In the embodiment of FIG. 5, the sleeve segment 52 includes a male post 46 that is formed on the sleeve 52 at the defined extension angle. The tubular member 40 includes an open end at the first end 30 that slides onto the post 46. Bolt holes 48 in the tubular member 40 align with bolt holes 48 in the post 46 for placement of through-bolts to fasten the tubular member 40 relative to the sleeve segment 52. It should be appreciated that the post 46 configuration may be utilized with the unitary ring member 50 embodiment of the sleeve 26.

In the embodiment of FIG. 5, the legs 28 may also be affixed to the posts 46 with the use of the same or similar adhesive compound material 44 used to attach the sleeve 26 to the tower 12. For example, the material 44 could be applied as a layer between the post 46 and the inner circumference of the leg 28.

Because the support system 24 provides the designed degree of lateral and vertical support for the tower 12 (as well as all of the components mounted atop the tower 12), the base sections of the tower 12 need not be as wide or heavy as in prior tower structures. In a particular embodiment depicted for example in FIGS. 1 and 2, the tower 12 may thus have a relatively constant diameter 58 from the location of the sleeve 26 to the base end 20. In other words, the tower 12 need not taper significantly outwardly towards the base end 20 in order to provide a relatively large support footprint as in prior art tower structures. In addition, the tower 12 incorporating the support system 24 need not have the weight required in other tower structures. In this regard, the tower may have a relatively constant mass per unit of length from the sleeve 26 to the base end 20.

Referring to FIG. 1, it should also be appreciated that the extension angles 36, 37 between the various support legs 28, as well as the length 38 of the support legs 28, can vary between the different legs. In FIG. 1, it can be seen that the left hand-most support leg 28 has an extension angle 37 that is greater than the extension angle 36 of the other support legs 28, as well as a decreased length 38. The difference in the angles 36, 37 and length 38 is due, in part, to the rise in the terrain at the location of the footing 34. It should thus be appreciated that the support legs 28 may vary as a function of the location of the tower 12, which also allows the tower 12 to be erected on sloped terrain, or at the base of a hill or other rise in the terrain, and so forth. Sites that were not previously available may be utilized for erection of wind turbines 10 utilizing the tower support system 24.

It should also be appreciated that the present invention encompasses a support system 24 for wind turbine towers as discussed above. For example, the support system 24 may be provided as a kit for assembly to a wind turbine tower 12 during initial production of the wind turbine 10, or as a repair, retrofit, or upgrade system for existing wind turbines. The support system 24 of this separate invention may have any of the features discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine, comprising:
   a nacelle;
   a tower having a base end configured for support on a ground level foundation, said nacelle mounted atop said tower;
   a tower support system, said tower support system further comprising:
      an axially extending circumferential sleeve mounted around said tower at a location between said base end and said nacelle;
      a plurality of support legs having a first end rigidly affixed to said sleeve and an opposite foot end configured for mounting to a ground level footing;
      said support legs extending from said sleeve with a length and at an acute extension angle relative to a longitudinal axis of said tower so as to provide vertical and lateral support around the circumfere of said tower; and,
      an adhesive compound material between said sleeve and said tower;
   said tower being a tubular member with a substantially constant diameter at the location of said sleeve such that said sleeve is concentrically spaced from said tower by said adhesive compound without being engaged against said tower.

2. The wind turbine as in claim 1, wherein said support legs comprise tubular members equally circumferentially spaced around said sleeve.

3. The wind turbine as in claim 1, wherein said first end of said support legs are permanently affixed to said sleeve.

4. The wind turbine as in claim 1, wherein said first end of said support legs are mechanically fastened to and releasable from said sleeve.

5. The wind turbine as in claim 4, wherein said sleeve further comprises male posts affixed to said sleeve at each location of a respective support leg, said support legs slidable onto said posts.

6. The wind turbine as in claim 1, wherein said sleeve comprises an integrally formed ring member that slides onto said tower.

7. The wind turbine as in claim 1, wherein said sleeve comprises a plurality of segments that are joined together around said tower.

8. The wind turbine as in claim 7, wherein each said segment comprises at least one said support leg extending therefrom.

9. The wind turbine as in claim 8, wherein said first end of said support legs are permanently affixed to a respective said segment at a pre-defined extension angle.

10. The wind turbine as in claim 1, wherein said sleeve is disposed on said tower at a height of between about 25% to about 75% of the tower height.

11. The wind turbine as in claim 1, wherein said tower has a substantially constant diameter from said sleeve to said base end.

12. The wind turbine as in claim 11, wherein said tower has a substantially constant mass per unit of length from sleeve to said base end.

13. The wind turbine as in claim 1, wherein said extension angle varies between different ones of said support legs.

14. The wind turbine as in claim 13, wherein an extension length varies between different ones of said support legs.

* * * * *